Nov. 15, 1955     A. M. ZALKIND     2,723,464
EDUCATIONAL TOY COUNTING DEVICE
Filed April 2, 1953
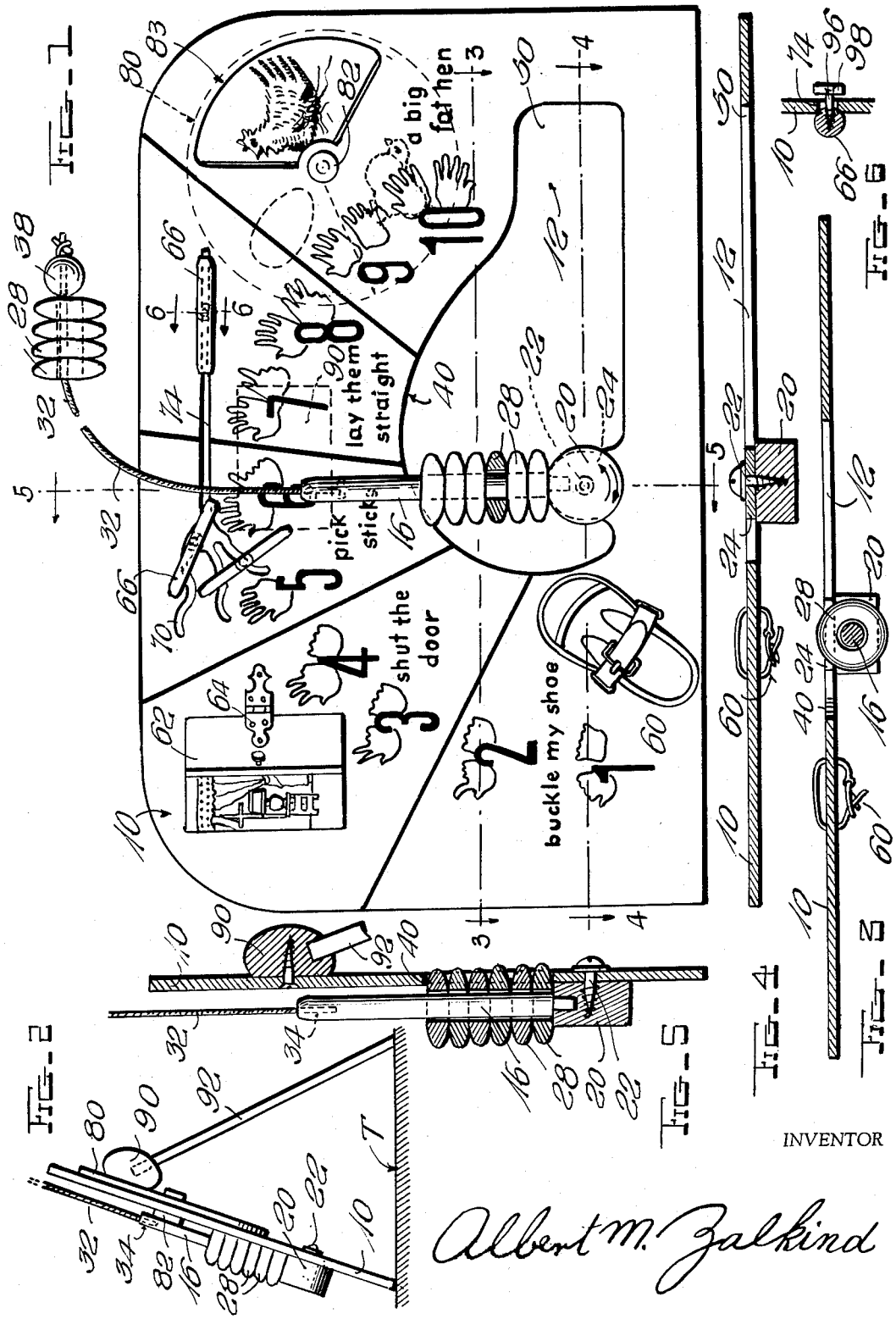
INVENTOR
Albert M. Zalkind

United States Patent Office 2,723,464
Patented Nov. 15, 1955

2,723,464

EDUCATIONAL TOY COUNTING DEVICE

Albert M. Zalkind, Arlington, Va.

Application April 2, 1953, Serial No. 346,430

6 Claims. (Cl. 35—32)

This invention relates to educational toy devices and more particularly to a device for teaching children the fundamentals of counting and numeral recognition.

It is an object of the invention to provide a toy which will be simple to operate and economical to manufacture and which will provide a child with a number of manipulatable elements including a plurality of counting units which can be assembled in selected quantities associated with means for indicating the number of units in such quantity. It is a further object of the invention to provide a toy having a high degree of play value in order to maintain the interest of a child and to encourage him to benefit educationally. It is a further object of the invention to associate various manipulative tasks with various numerals to assist the child in remembering the visual aspect of the numerals.

It is a well known fact that very young children learn to count by repeating numbers in correct sequence, even though they do not recognize such numbers when graphically presented. My invention exploits a child's ability to count verbally by providing means to associate verbal counting with visual numerals.

Basically the structure comprises a plurality of identical rings which can be mounted on a stick such as a dowel, wherein the dowel is oscillatably mounted on a panel. The panel is provided with a cutout portion having an arcuate edge so shaped that the outermost ring of an assembly rings on the stick will engage the edge at some point corresponding to the quantity of rings assembled. By associating a scale of numerals with the arcuate edge, the stick becomes a pointer to indicate the correct numeral corresponding to the number of rings thereon. This basic concept may be combined with manipulative elements familiar to a child and related to a well known nursery rhyme which is represented on the panel and associated with the numerals on the rotative stick.

The invention will now be described in detail in conjunction with the appended drawing in which:

Fig. 1 is a front view of the device showing all essential elements.

Fig. 2 is an elevation.

Fig. 3 is a section through 3—3 of Fig. 1.

Fig. 4 is a section through 4—4 of Fig. 1.

Fig. 5 is a section through 5—5 of Fig. 1, and

Fig. 6 is a section through 6—6 of Fig. 1.

Referring now to the drawing, the invention comprises a panel 10 of suitable board material having a cutout 12 and a dowel stick 16 rotatively mounted on the panel by means of a hub 20 secured as by a screw 22 to a panel portion 24 which protrudes into cutout area 12.

A plurality of ten wooden beads or rings 28 are associated with the dowel stick in such a manner that any selected quantity thereof may be placed on the stick in contiguity with hub 20 so as to rest thereon, the hub having a flat upper surface to accommodate the rings, as shown. The rings are permanently associated with the stick by providing a string 32 secured in a bore 34 at the end of the stick, as by cementing, or by wedging a nail into the bore from the outer end of the stick. A wood ball 38 is secured in any suitable manner to the outer end of the string 32, the diameter of the ball being larger than the holes in the rings. Thus, while any selected quantity of rings may be placed on the stick, the remainder of the rings remain on the string, being blocked by the ball 38 to prevent loss.

The cutout 12 comprises an arcuate edge 40 which is laid out on a curve such that succeeding areas of the edge are at progressively varying distances from the axis of rotation of hub 20. Further, the spacing of stick 16 from panel 10 is such, depending upon the diameter of rings 28, that the outermost ring on the stick will engage somewhere along the edge 40 as the stick is rotated counterclockwise. Accordingly, it will be appreciated that the outermost ring will strike some area of edge 40, depending upon how many rings are on the stick. By providing a scale of numerals from one to ten on the panel, it will be apparent that the extended end of the stick will serve as a pointer to indicate appropriate numerals.

The cutout 12 is provided with an extending open area which is designated by 50 so as to render access to the stick for placing rings easily thereon, the stick being then rotated to a horizontal position. It will be appreciated that the device is constructed with sufficient rigidity such that the portions of the rings which protrude through the cutout 12 will upon engagement with some appropriate area of edge 40 prevent further counter clockwise rotation of stick 16. In other words, there should be sufficient rigidity to prevent the rings from camming past edge 40 and bending the stick outwardly.

The layout of the curve for edge 40 is a comparatively simple matter as will be apparent to persons skilled in the art and it may be made sufficiently accurate so that the stick will clearly indicate individual numbers, or it may also be made suitable for rhymes such as is shown on the panel of Fig. 1 wherein the numbers are grouped in pairs. For example, if one or two rings are used, the stick will indicate the area corresponding to 1-2, "button my shoe," the same scheme being used for the remaining areas of numerical pairs.

As seen on Fig. 1, various manipulative tasks are provided for on the panel, associated with appropriate numerals. Thus, a small shoe strap 60 is carried in slots in the panel in association with a representation of a shoe printed on the panel. Accordingly, the child would first place one or two rings on the stick and then swing the stick over until it indicated the one or the two, or the one-two area, and proceed to buckle the strap 60. In the same manner, a little swinging door 62 fastened to the panel by a hinge 64 is manipulated, for 3-4 "shut the door." Likewise, a series of sticks 66 associated with 5-6 "pick up stick" are slidably secured in tortuous slots 70 in such a manner that they can be slid into aligned arrangement with adjoining slot 74 as the child progresses to 7-8 "lay them straight." Finally, at 9-10, "a big fat hen," rotary disc 80 is provided carried rearwardly of the panel in such a way that it can be rotated by a knob 82 wherein a segment of the disc is visible through a window 83 coupling the panel. Each segment is provided with a picture pertaining to the hen. For example, a hen, an egg, and a chick.

The face of the panel is further embellished for each numeral with a pair of hands wherein the fingers extending indicate the value of the respective numerals.

Various structural details of a minor nature are likewise apparent on the drawing, although it will be obvious to persons skilled in the art that many structural variations may be made. For purposes of simplicity, an arrangement for holding the panel in suitably erect position is provided comprising a wood block 90 secured to the rear of the panel in any suitable manner and centrally located wherein a dowel strut 92 is removably fitted into a socket in block 90 and serves to prop the panel in suitable relation to a table top T as shown in Fig. 2. Further, the sticks 66 may be permanently associated with the panel as by a bolt and nut arrangement 96 and 98, as shown in Fig. 6.

It will be apparent to persons skilled in the art that the basic concept described above may be considerably varied without departing from the spirit of the invention and accordingly I do not seek to be limited to the specific illustration except as set forth in the appended claims.

I claim:

1. An educational toy comprising a plurality of elements and means for assembling a selected quantity of said elements in fixed position relative to each other whereby the array thus formed has a fixed dimension depending upon the quantity of elements selected, a gauge element comprising means movable relative to said array, said gauge element having means comprising a plurality of areas engageable with said fixed array, the area engaged depending on the quantity of elements in any selected array, and indicating means for indicating said quantity responsive to the degree of relative motion required to effect engagement of said array with one of said areas.

2. An educational toy comprising a panel, support means rotatively secured to said panel, a plurality of elements individually securable to said support means to form an assembly of a selected quantity of said elements, said panel being provided with an arcuate edge for engaging the outermost of said elements when said support means is rotated relative thereto, said edge being shaped so as to have areas spaced from the center of rotation of said support means at progressively varying distances so that said engagement occurs at a predetermined area depending on the quantity of elements assembled and a scale represented on said panel to show the appropriate quantity of elements represented by the respective engageable areas.

3. An educational toy comprising a plurality of elements, holder means for holding a selected quantity of said elements in a uniformly increasable assembly, a panel, said holder means being movable a fixed path with respect to said panel, said panel being provided with a gauging edge of varying shape relative to the position of said fixed path corresponding to the uniform increasability of said assembly whereby said assembly is engageable with said edge at a point corresponding to the quantity of units in said assembly, and a scale related to said edge for determining the numerical value of selected quantities at spaced distances along said edge.

4. In an educational toy, a plurality of identical rings, a stick on which said rings may be assembled, a panel on which said stick is rotatively mounted, a cutout in said panel having an edge varying progressively in distance from the center of rotation of said stick whereby when said stick is rotated, the outermost ring of an assembly of rings thereon will engage said edge at a point depending upon the quantity of rings in said assembly.

5. A toy as set forth in claim 4, wherein said stick is extended substantially beyond the boundary of said progressively varying edge to serve as a pointer, and a scale on said panel having numerals to be indicated by the position of said stick corresponding to the number of rings in said assembly.

6. A toy as set forth in claim 4, including a string secured to the outer end of said stick and a detaining element secured at the end of said string wherein said element is larger than the apertures through said rings to prevent loss thereof.

References Cited in the file of this patent

UNITED STATES PATENTS

| | | |
|---|---|---|
| 1,594,376 | Passmore | Aug. 3, 1926 |
| 1,950,072 | Townsend | Mar. 6, 1934 |
| 2,486,260 | Church | Oct. 25, 1949 |
| 2,490,342 | Essington | Dec. 6, 1949 |